United States Patent
Augenstein et al.

(10) Patent No.: US 7,617,260 B2
(45) Date of Patent: Nov. 10, 2009

(54) DATA SET VERSION COUNTING IN A MIXED LOCAL STORAGE AND REMOTE STORAGE ENVIRONMENT

(75) Inventors: Oliver Augenstein, Dettenhausen (DE); Neeta Garimella, San Jose, CA (US); James Patrick Smith, Redwood City, CA (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 11/271,037

(22) Filed: Nov. 10, 2005

(65) Prior Publication Data

US 2007/0106709 A1 May 10, 2007

(51) Int. Cl.
*G06F 17/30* (2006.01)
(52) U.S. Cl. .............. 707/204; 707/203; 707/205; 707/202; 709/214; 709/215; 715/229
(58) Field of Classification Search ............. 707/202, 707/203, 204, 205; 709/214, 215; 715/229
See application file for complete search history.

(56) References Cited

U.S. PATENT DOCUMENTS

| | | | | |
|---|---|---|---|---|
| 5,193,171 A * | 3/1993 | Shinmura et al. | ............ | 711/113 |
| 5,410,667 A * | 4/1995 | Belsan et al. | ............ | 711/114 |
| 5,579,516 A * | 11/1996 | Van Maren et al. | ............ | 707/1 |
| 6,173,377 B1 * | 1/2001 | Yanai et al. | ............ | 711/162 |
| 6,425,059 B1 * | 7/2002 | Basham et al. | ............ | 711/153 |
| 6,611,901 B1 * | 8/2003 | Micka et al. | ............ | 711/162 |
| 6,654,752 B2 | 11/2003 | Ofek | | |
| 6,728,713 B1 * | 4/2004 | Beach et al. | ............ | 707/10 |
| 6,804,690 B1 | 10/2004 | Dysert et al. | | |
| 7,000,145 B2 * | 2/2006 | Werner et al. | ............ | 714/20 |
| 2004/0167902 A1 * | 8/2004 | Margolus | ............ | 707/10 |
| 2004/0260898 A1 | 12/2004 | Stanley et al. | | |
| 2005/0193239 A1 | 9/2005 | Shackelford | | |

OTHER PUBLICATIONS

Burns, R. et al, "Efficient Distributed Backup with Delta Compression", © 1997 ACM, pp. 26-36.
Gifford, D., "Weighted Voting for Replicated Data", © 1979 ACM, pp. 150-162.
Adya, A. et al, "FARSITE: Federated, Available, and Reliable Storage for an Incompletely Trusted Environment", *5th Symposium on Operating Systems Design and Implementation*, USENIX Association, Microsoft Research, Redmond, WA 98052, pp. 1-14.
Communication Pursuant to Article 94(3) EPC for Application 06 807 503.5-1245, filed Aug. 19, 2008, 3 pp.

(Continued)

*Primary Examiner*—James Trujillo
*Assistant Examiner*—Fatima P Mina
(74) *Attorney, Agent, or Firm*—Janaki K. Davda; Konrad Raynes & Victor, LLP

(57) ABSTRACT

Provided are techniques for storing local versions of a data set. A first number that indicates how many local versions of the data set are to be stored in local storage given an amount of available local storage is received. It is determined whether a second number that indicates a total number of local versions of the data set that the local storage is capable of storing exceeds the first number. In response to determining that the second number exceeds the first number, the amount of local storage that is capable of storing the first number of local versions of the data set is used.

24 Claims, 4 Drawing Sheets

OTHER PUBLICATIONS

EP Response, Feb. 17, 2009, for EP Application No. 06807503.5-1245, 1 pp.

International Search Report and Written Opinion dated Aug. 31, 2007 for application No. PCT/EP2006/067708 filed Oct. 24, 2006.

* cited by examiner

DATA SET VERSION COUNTING IN A MIXED LOCAL STORAGE AND REMOTE STORAGE ENVIRONMENT

BACKGROUND

1. Field

Embodiments of the invention relate to data set version counting in a mixed local storage and remote storage environment.

2. Description of the Related Art

In conventional systems, when a data set resides at a local computing device, it may be useful to maintain a backup copy of the data set at a remote backup system (e.g., for data recovery in case of loss of the data at the local computing device).

Backup and storage management products offer sets of policy constructs to dictate how data is managed. A policy construct may be described as a rule. One of these policy constructs dictates how many copies of a backup data set is to be maintained at the remote backup system for a data set that exists in local storage at the local computing device (as opposed to a data set that has been deleted on a computer, for which there are other policy constructs). For example, a user may specify that three versions of a data set should be maintained in remote storage at the remote backup system for a given existing data set in the local storage. The remote backup system manages the remote storage such that when a fourth data set is received, the remote backup system discards the first version of the data set (effectively keeping the second, third, and fourth versions of the data set).

In conventional systems, a backup data set may be generated outside of the context of the remote backup system. These may be referred to as "local backup operations". For example, software or hardware snapshots of data may be generated by products that are not necessarily integrated into the remote backup system, such as a third-party snapshot software packages that may generate snapshots of data on the local computing device or hardware systems that do so (e.g., IBM(®) Enterprise Storage Server® (ESS) system available from International Business Machines Corporation). Further details of a snapshot operation are disclosed in U.S. Pat. No. 5,410,667 entitled "Data Record Copy System for a Disk Drive Array Data Storage Subsystem," which issued on Apr. 25, 1995, which patent is incorporated herein by reference in its entirety. Counting versions of data sets with these techniques differs from counting versions of data sets at a remote backup system.

First, in a traditional remote backup system, the remote storage is opaque to the local computing device. That is, the local computing device assumes that there is sufficient remote storage to store at least the number of versions that the user at the local computing device wants to manage. Also, in this type of remote backup system out of storage conditions are exceptions. In fact, the remote backup system may keep more versions than the user requests for a period of time. For example, if the user specifies to keep three versions of a data set and a fourth version of the data set is sent to the remote backup system, the remote backup system may keep all four versions subject to an expiration process that deletes the unwanted versions of data sets. The expiration process may be described as asynchronous as it has no time dependency on adding the fourth, fifth, sixth, etc. data version. Furthermore, if the data set backup is more frequent than the expiration process, there may be even more versions of backup data sets queued up to be expired from the remote backup system.

Local backup data sets may represent terabytes of data. If a user has a data set which is 100 Gigabytes (GB) in size and has a policy construct which manages three versions of the data set, the user technically needs to have at least four 100 GB storage containers available. A storage container may be described as a logical portion of the remote storage (i.e., a set of physical disk space) used by the remote backup system to store a data set version. After three storage containers are filled with three versions of local backup data sets, the fourth storage container is used to house the fourth version, after which the storage container for the first version may be released.

An alternate approach to this problem is for the local computing device to delete one of the three backup data sets before the backup of the fourth data set. This alleviates the need for the user to have four storage containers to house three versions of a backup data set. The drawback to this alternate approach is that, while the fourth backup operation is executing (which could take several hours), the user only has two versions of the backup data set from which to perform a restore operation, which does not adhere to the policy construct. Also, if the backup of the fourth data set were to fail, the user would be left with two versions of the backup data set. In this type of remote backup system, out of storage conditions are normal.

A number of direct access storage device (DASD) subsystems are capable of performing "instant virtual copy" operations, also referred to as "fast replicate functions." Instant virtual copy operations work by modifying metadata, such as relationship tables or pointers, to treat a source data object as both the original and copy. In response to a copy operation request received at a storage controller (which provides access to storage), creation of the copy is reported without having made any physical copy of the data. Only a "virtual" copy has been created, and the absence of an additional physical copy is completely unknown to the originator of the copy operation request.

Later, when the storage controller receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the storage controller to perform other tasks. The storage controller may even proceed to create an actual, physical copy of the original data object during background processing, or at another time.

One such instant virtual copy operation is known as a FlashCopy® operation. Further details of an instant virtual copy operation are described in U.S. Pat. No. 6,611,901, issued on Aug. 26, 2003, and entitled "Method, System, and Program for Maintaining Electronic Data as of a Point-in-Time", which patent is incorporated herein by reference in its entirety.

A second problem with the traditional technique of counting backup versions is that it assumes that the backups of the versions have been completed and committed to the remote backup system. For large backups of local data sets (e.g., a FlashCopy® backup operation), the local storage may be in use at the time a subsequent backup operation is performed. For example, the user may currently have three local containers and two versions of local FlashCopy® data and may initiate a local FlashCopy® backup operation, which takes four hours. At this point in time, two of the local storage containers are used for valid data set versions and the third storage container is allocated to the current process. At some time two hours later ("time t1"), the user initiates another backup operation. At this point, the user has to re-use one of the two local storage containers to dedicate to this backup operation. This leaves one local storage container with valid backup data and two local storage containers dedicated to backup operations. If both of the backup operations were to fail, the user would be left with one backup data set. If the user were to try to restore data at this point in time, there would be only one valid data set from which to restore, which is not what the user intended when the policy was set up to keep three versions of data.

A third problem is that the end user has to explicitly set up the local storage correctly to match the number of versions that the remote backup system manages. For example, if the user sets up a policy to manage three versions v(1) on the remote backup system, the user must ensure that there is sufficient local storage s(1) to store the three versions v(1). If the user has additional local storage s(1), the additional local storage may be used to alleviate problems in the examples above, but if the user only has enough local storage to store the desired number of versions (s(1)=v(1)), another set of rules would apply when taking backups after all of the local storage has been used.

A fourth problem is that different backup technologies may be used on the same pool of local storage. For example, instant virtual copy and incremental virtual copy may be used on the same pool of local storage. Further details of an incremental virtual copy operation are described in U.S. patent application Ser. No. 10/465,118, and entitled "Method, System, and Program for Incremental Virtual Copy", filed on Jun. 18, 2003, which patent application is incorporated herein by reference in its entirety. An incremental virtual copy operation is an enhancement to an instant virtual copy operation. With the incremental virtual copy operation, only the blocks of data that were updated on source and target volumes since the last copy operation (e.g., instant virtual copy operation) from the source volume to the target volume are copied.

For example, assume that a user has three sets of local storage containers, sc(1) and wants to take a full instant virtual copy backup at 12:00 and incremental virtual copy backups every two hours. Therefore, storage container sc(1)1 is used for the full backup at 12:00. At 2:00, storage container sc(1)2 is used for the incremental virtual copy. At 4:00, storage container sc(1)2 is re-used for the incremental virtual copy (in situations in which there may only be a single set of incremental virtual copy relationships). Storage container sc(1)3 is not used until 12:00 when another full instant virtual copy is taken. The fact that incremental virtual copy relationships are mixed in with full instant virtual copy operations makes it even more difficult to explain to the user how the version counting is used in the mixed-mode environment.

Thus, the traditional techniques of counting backup versions correlates to the number of versions that the user may want to restore at any point in time. When introducing local storage that stores versions of data sets that are managed outside of the remote backup system, it becomes difficult to instruct the user on how much storage space needs to be allocated in local storage to assure that a desired number of backup versions may be restored at any given point in time.

Thus, there is a need in the art for improved data version counting in a mixed local storage and remote storage environment.

SUMMARY OF THE INVENTION

Provided are a method, article of manufacture, and system for storing local versions of a data set. A first number that indicates how many local versions of the data set are to be stored in local storage given an amount of available local storage is received. It is determined whether a second number that indicates a total number of local versions of the data set that the local storage is capable of storing exceeds the first number. In response to determining that the second number exceeds the first number, the amount of local storage that is capable of storing the first number of local versions of the data set is used.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
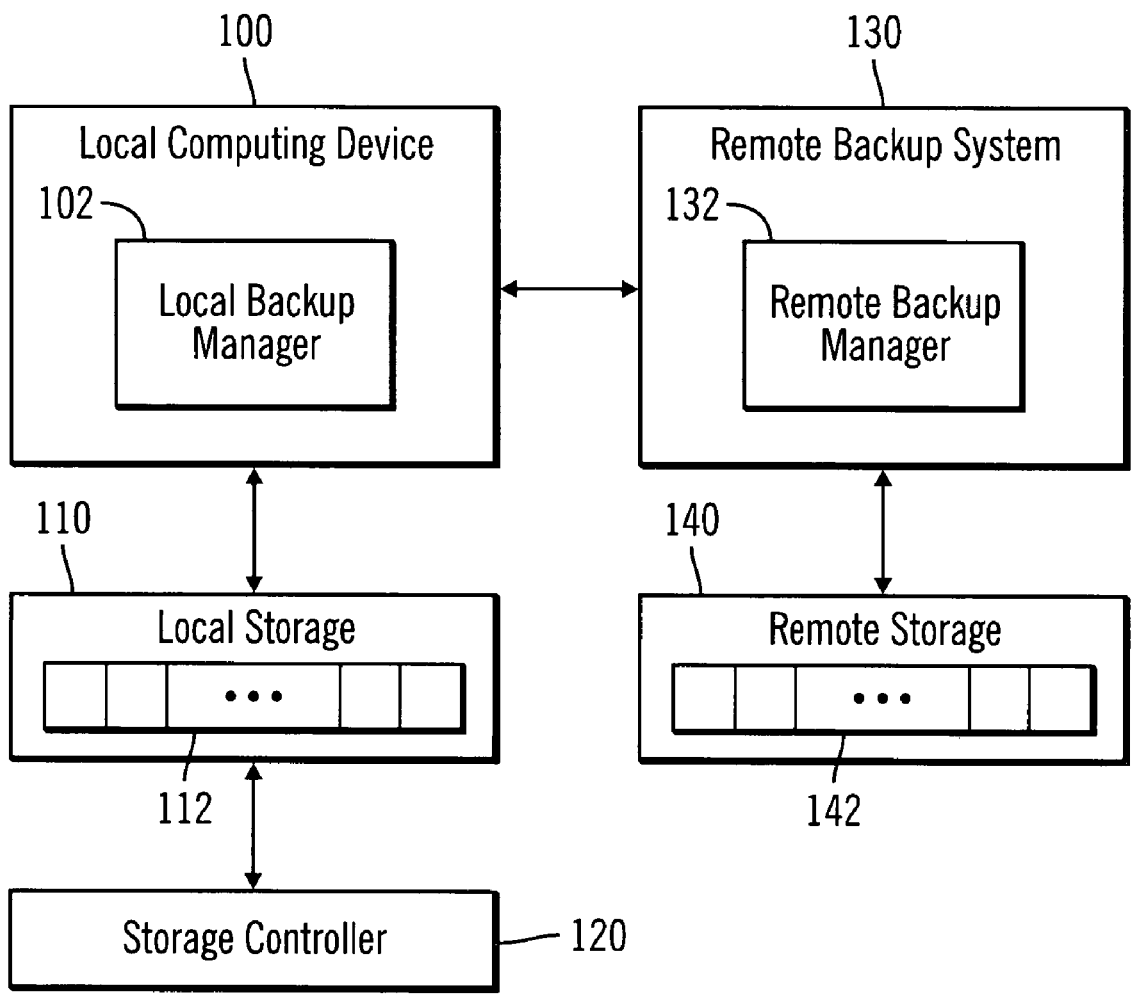
FIG. 1 illustrates details of a computing device in which certain embodiments may be implemented.

FIG. 1 illustrates a computing environment in accordance with certain embodiments of the invention. A local computing device 100 includes a local backup manager 102 that manages local versions of data in local storage 110. The local computing device 100 is coupled to local storage 110. The local storage 110 comprises one or more physical storage devices, such as Direct Access Storage Device (DASD). The local storage 110 may be partitioned into one or more local storage containers 112.

A storage controller 120 may also be coupled to local storage 110. The storage controller 120, which may also be referred to as a control unit or storage director, manages access to the local storage 110 from other computing devices (not shown).

The local computing device 100 is also coupled to a remote backup system 130. The remote backup system 130 includes a remote backup manager 132 that manages backup versions of data in remote storage 140. The remote backup system 130 is coupled to remote storage 140. The remote storage 140 comprises one or more physical storage devices, such as Direct Access Storage Device (DASD). The remote storage 140 may be partitioned into one or more remote storage containers 142.

In certain embodiments, removable storage (instead of or in addition to remote storage, such as remote storage 142) may be used to maintain back-up copies of all or a subset of the local storage 110. The removable storage may reside at the local computing device 100.

Figure 2A:
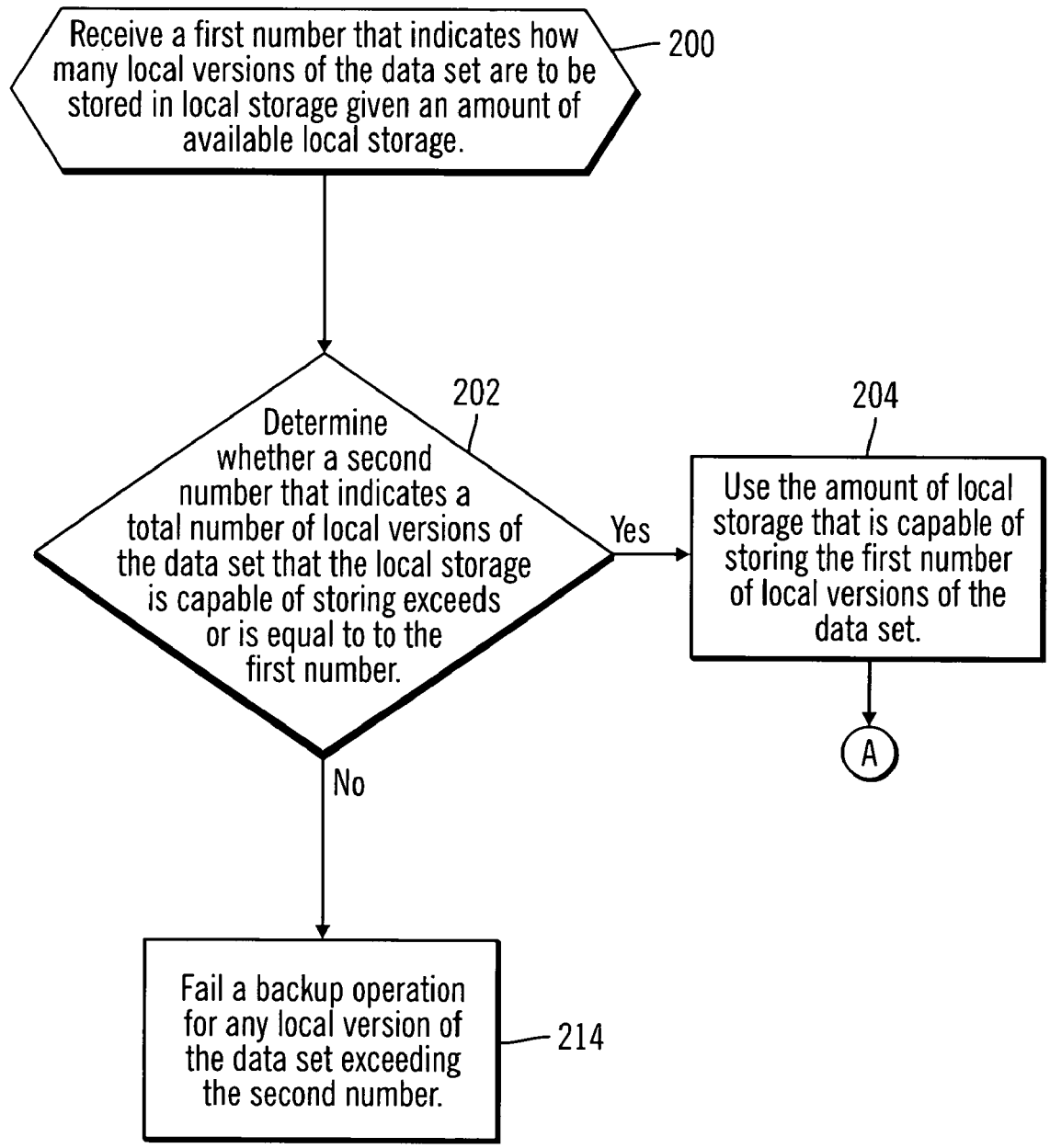
FIGS. 2A and 2B illustrate logic for managing local versions in local storage in accordance with certain embodiments.
Figure 2B:
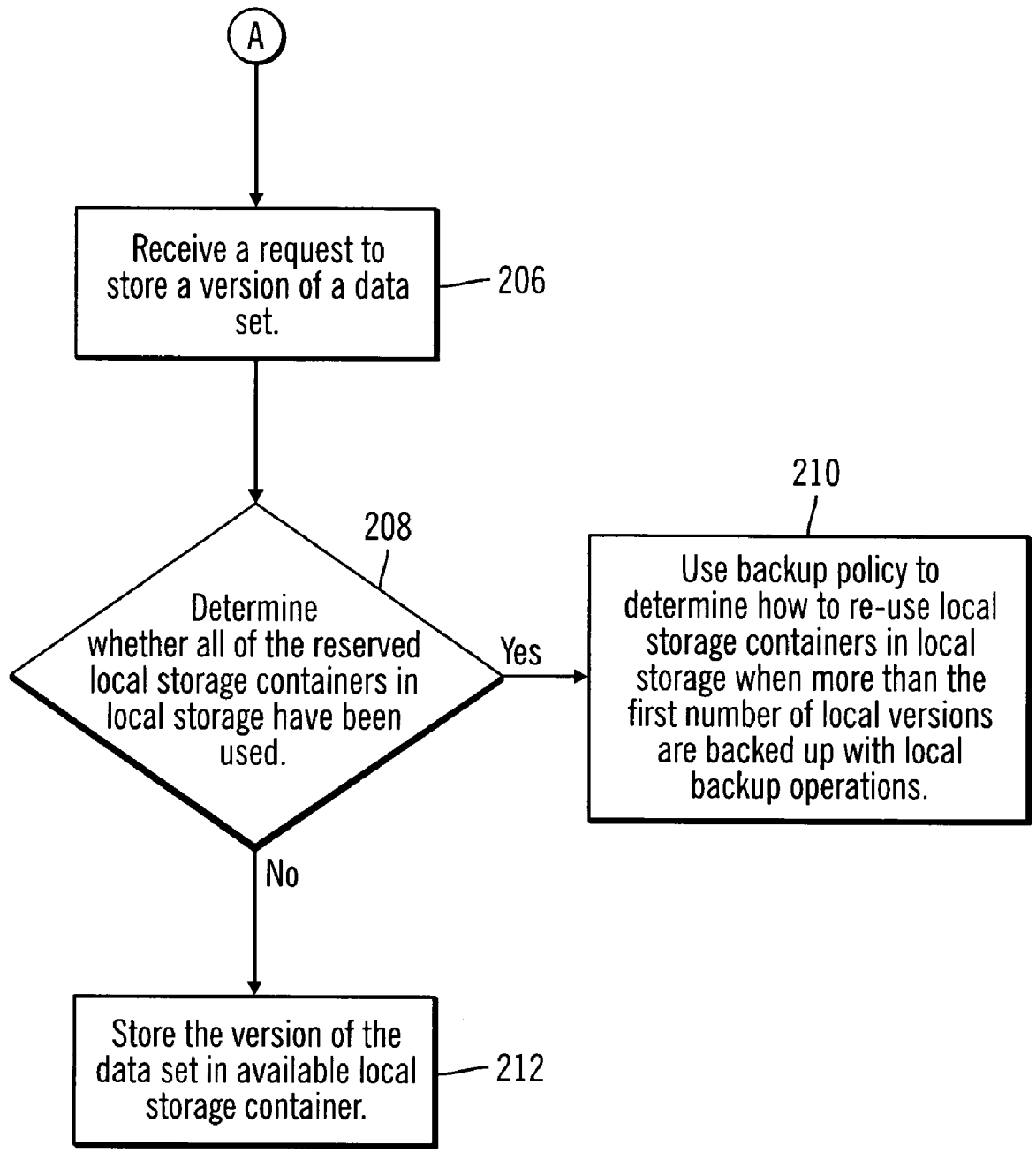

FIGS. 2A and 2B illustrate logic for managing local versions in local storage 110 in accordance with certain embodiments. A policy construct may be described as a rule (e.g., store three versions of a local backup data set). A user provides policy constructs for managing data sets. Certain embodiments provide a new policy construct that defines how many versions of a data set are to be stored in local storage 110 given the amount of local storage available. Certain alternative embodiments overload an existing policy construct to define how many versions of a data set are to be stored in local storage 110 given the amount of local storage available. It is possible for the user to have more local storage 110 than is needed by a policy construct (e.g., the user indicates that there is enough local storage for three versions of local backup data when there is enough local storage for five versions).

Control begins at block 200 of FIG. 2A with the local backup manager 102 receiving a first number that indicates how many local versions of the data set are to be stored in local storage given an amount of available local storage 110. In block 202, it is determined whether a second number that indicates a total number of local versions of the data set that the local storage 110 is capable of storing exceeds or is equal to the first number. That is, the second number represents the actual number of local versions that the local storage may store. If the second number exceeds the first number (e.g., second number indicates that local storage is capable of storing five local versions, and the first number indicates that three local versions are to be stored), then processing continues to block 204, otherwise, processing continues to block 214. In block 204, the local backup manager 102 uses the amount of local storage 110 that is capable of storing the first number of local versions of the data set.

In certain embodiments, any additional, available local storage 110 is not used (e.g., if the number of local versions is three, and the amount of available local storage 110 may store five local versions, then the additional local storage is not used).

In certain embodiments, the amount of storage used is a third number of local storage containers, where the first number and third number are equivalent (e.g., if the first number indicates three local versions, then the third number indicates three local storage containers). From block 204, processing continues to block 206 (FIG. 2B).

In block 206, the local backup manager 102 receives a request to store a version of a data set. In block 208, the local backup manager, 102 determines whether all of the local storage containers reserved for storing versions of the requested data set in local storage 110 have been used (i.e., the third number of local storage containers). If so, processing continues to block 210, otherwise, processing continues to block 212. In block 210, the local backup manager 102 uses a backup policy to determine how to re-use the third number of local storage containers in the local storage 110 when more than the first number of local versions are backed up with local backup operations (e.g., three local versions are to be maintained, and the backup policy is used to determine how to store the fourth local version by re-using one of the containers). In block 212, the local backup manager 102 stores the version of the data set in an available local storage container.

The backup policy may be described as including additional constructs that define how to re-use the local storage containers based on the local backup technology employed. For example, the local backup manager 102 may implement a policy such as: (1) if the requested backup is an instant virtual copy operation, re-use the local storage container representing the oldest full copy as long as there are no other virtual instant copy operations on one of the other local storage containers and (2) if the requested backup is an incremental virtual copy operation, re-use the local storage container representing the backup copy that was established with an incremental relationship as long as there are no background copy processes or incremental refreshes still in effect on the volumes in that local storage container.

In block 214, in response to determining that the first number exceeds the second number, (e.g., the first number indicates that six local versions are to be stored, and the second number indicates that local storage is capable of storing four local versions), a backup operation for any local version of the data set exceeding the second number is failed (e.g., if the number of local versions is five, and the number of available local storage containers is four, the backup operation creating the fifth local version will fail). In certain embodiments, a message is issued to indicate that there is not enough storage available for the backup operation.

Thus, embodiments provide a technique for data version counting for local storage; where the version counting for remote storage may be the same or different.

IBM is a registered trademark or common law mark of International Business Machines Corporation in the United States and/or other countries.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

The logic of FIGS. 2A and 2B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A and 2B may be implemented in software, hardware, programmable and non-programmable gate array logic or in some combination of hardware, software, or gate array logic.

Figure 3:
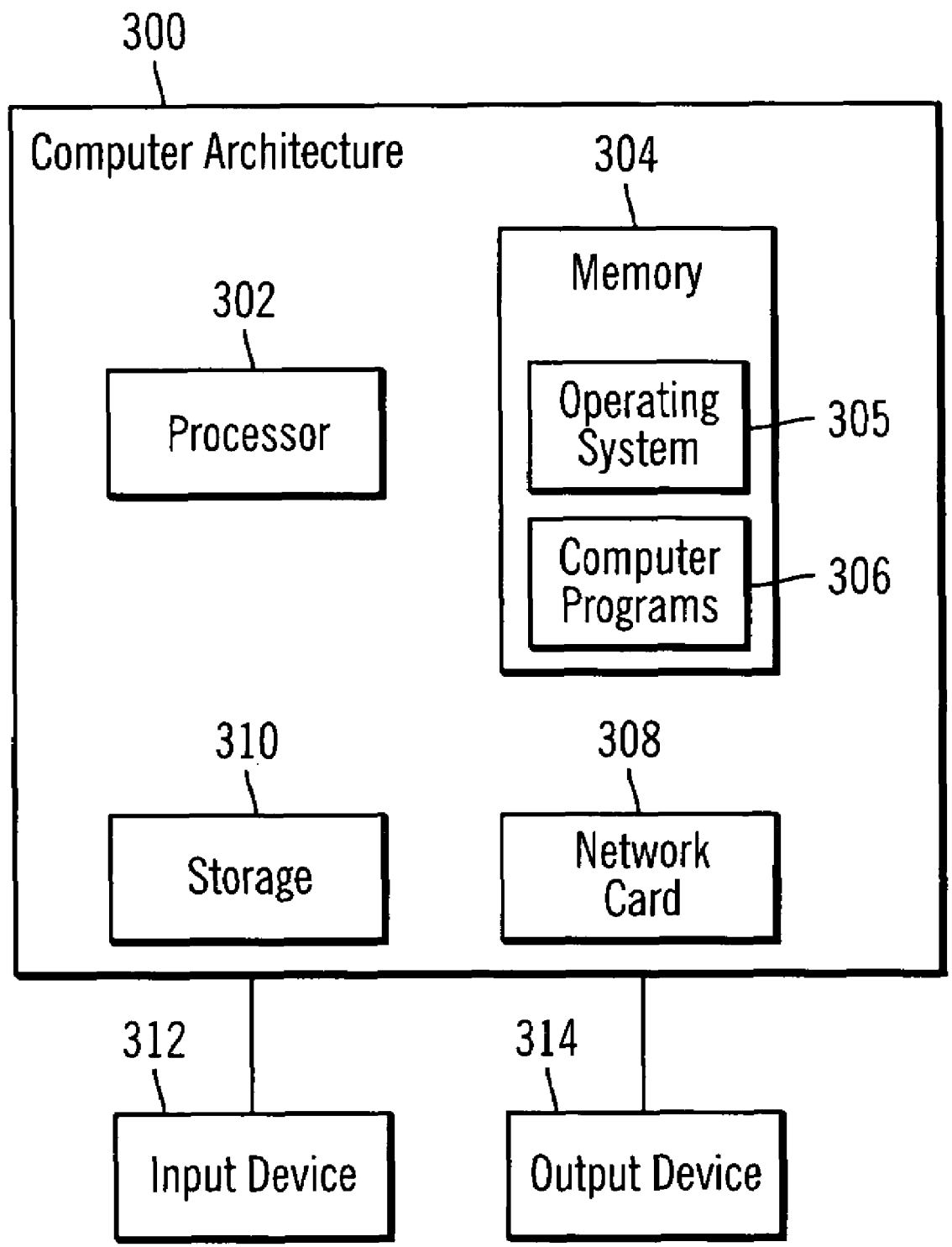
FIG. 3 illustrates an architecture of a computer system that may be used in accordance with certain embodiments.

FIG. 3 illustrates an architecture 300 of a computer system that may be used in accordance with certain embodiments.

Local computing device 100, storage controller 120, and/or remote backup system 130 may implement architecture 300. The computer architecture 300 may implement a processor 302 (e.g., a microprocessor), a memory 304 (e.g., a volatile memory device), and storage 310 (e.g., a non-volatile storage area, such as magnetic disk drives, optical disk drives, a tape drive, etc.). An operating system 305 may execute in memory 304. The storage 310 may comprise an internal storage device or an attached or network accessible storage. Computer programs 306 in storage 310 may be loaded into the memory 304 and executed by the processor 302 in a manner known in the art. The architecture further includes a network card 308 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information from the processor 302, or other component, such as a display monitor, printer, storage, etc. The computer architecture 300 of the computer systems may include fewer components than illustrated, additional components not illustrated herein, or some combination of the components illustrated and additional components.

The computer architecture 300 may comprise any computing device known in the art, such as a mainframe, server, personal computer, workstation, laptop, handheld computer, telephony device, network appliance, virtualization device, storage controller, etc. Any processor 302 and operating system 305 known in the art may be used.

The foregoing description of embodiments of the invention has been presented for the purposes of illustration and description. It is not intended to be exhaustive or to limit the embodiments of the invention to the precise form disclosed. Many modifications and variations are possible in light of the above teaching. It is intended that the scope of the embodiments of the invention be limited not by this detailed description, but rather by the claims appended hereto. The above specification, examples and data provide a complete description of the manufacture and use of the composition of the embodiments of the invention. Since many embodiments of the invention may be made without departing from the spirit and scope of the embodiments of the invention, the embodiments of the invention reside in the claims hereinafter appended or any subsequently-filed claims, and their equivalents.

What is claimed is:

1. A method for storing versions of a data set, comprising:
   receiving a first number that indicates how many local versions of the data set are to be stored in local storage given an amount of available local storage, wherein the local storage is partitioned into one or more local storage containers;
   determining whether a second number that indicates a total number of local versions of the data set that the local storage is capable of storing exceeds the first number;
   in response to determining that the second number exceeds the first number, using the amount of local storage that is capable of storing the first number of local versions of the data set;
   receiving a request to store a version of the data set in the local storage with a local backup operation, wherein the local backup operation is one of an instant virtual copy operation and an incremental virtual copy operation; and
   in response to the request, using a backup policy to determine how to re-use a number of storage containers based on the local backup operation when more than the first number of local versions are backed up with local backup operations.

2. The method of claim 1, wherein a new policy construct is provided that defines how many local versions of the data set are to be stored in the local storage given the amount of available local storage.

3. The method of claim 1, further comprising:
   overloading an existing policy construct that defines how many local versions of the data set are to be stored in the local storage given the amount of available local storage.

4. The method of claim 1, wherein each local version of the data set is stored in one of the one or more local storage containers in the local storage.

5. The method of claim 1, wherein the amount of storage used is a third number of local storage containers and wherein the first number and third number are equivalent, further comprising:
   using the backup policy to determine how to re-use the third number of storage containers when more than the first number of local versions are backed up with the local backup operations.

6. The method of claim 5, wherein the local backup operation is the instant virtual copy operation, and wherein the backup policy indicates that a local storage container representing an oldest full copy is to be re-used as long as there are no other virtual instant copy operations on other local storage containers.

7. The method of claim 5, wherein the local backup operation is the incremental virtual copy operation and wherein a local storage container representing a backup copy that was established with an incremental relationship is re-used as long as there are no background copy processes or incremental refreshes still in effect on volumes in that local storage container, wherein the incremental virtual copy operation copies blocks of data that were updated on a source and a target since a last instant virtual copy operation from the source to the target.

8. The method of claim 1, further comprising:
   in response to determining that the first number exceeds the second number, failing a backup operation for any local version of the data set exceeding the second number.

9. An article of manufacture for storing local versions of a data set, wherein the article of manufacture comprises computer readable medium including code, wherein the code, when executed by a processor on a computer, causes operations to be performed, and wherein the operations comprise:
   receiving a first number that indicates how many local versions of the data set are to be stored in local storage given an amount of available local storage, wherein the local storage is partitioned into one or more local storage containers;
   determining whether a second number that indicates a total number of local versions of the data set that the local storage is capable of storing exceeds the first number;
   in response to determining that the second number exceeds the first number, using the amount of local storage that is capable of storing the first number of local versions of the data set;
   receiving a request to store a version of the data set in the local storage with a local backup operation, wherein the local backup operation is one of an instant virtual copy operation and an incremental virtual copy operation; and
   in response to the request, using a backup policy to determine how to re-use a number of storage containers based on the local backup operation when more than the first number of local versions are backed up with local backup operations.

10. The article of manufacture of claim 9, wherein a new policy construct is provided that defines how many local versions of the data set are to be stored in the local storage given the amount of available local storage.

11. The article of manufacture of claim 9, wherein the operations further comprise:
  overloading an existing policy construct that defines how many local versions of the data set are to be stored in the local storage given the amount of available local storage.

12. The article of manufacture of claim 9, wherein each local version of the data set is stored in one of the one or more local storage containers in the local storage.

13. The article of manufacture of claim 9, wherein the amount of storage used is a third number of local storage containers and wherein the first number and third number are equivalent, wherein the operations further comprise:
  using the backup policy to determine how to re-use the third number of storage containers when more than the first number of local versions are backed up with the local backup operations.

14. The article of manufacture of claim 13, wherein the local backup operation is the instant virtual copy operation, and wherein the backup policy indicates that a local storage container representing an oldest full copy is to be re-used as long as there are no other virtual instant copy operations on other local storage containers.

15. The article of manufacture of claim 13, wherein the local backup operation is the incremental virtual copy operation and wherein a local storage container representing a backup copy that was established with an incremental relationship is re-used as long as there are no background copy processes or incremental refreshes still in effect on volumes in that local storage container, wherein the incremental virtual copy operation copies blocks of data that were updated on a source and a target since a last instant virtual copy operation from the source to the target.

16. The article of manufacture of claim 9, wherein the operations further comprise:
  in response to determining that the first number exceeds the second number, failing a backup operation for any local version of the data set exceeding the second number.

17. A system for storing local versions of a data set, comprising:
  local storage, wherein the local storage is partitioned into one or more local storage containers; and
  hardware logic capable of performing operations, the operations comprising:
    receiving a first number that indicates how many local versions of the data set are to be stored in local storage given an amount of available local storage;
    determining whether a second number that indicates a total number of local versions of the data set that the local storage is capable of storing exceeds the first number;
    in response to determining that the second number exceeds the first number, using the amount of local storage that is capable of storing the first number of local versions of the data set;
    receiving a request to store a version of the data set in the local storage with a local backup operation, wherein the local backup operation is one of an instant virtual copy operation and an incremental virtual copy operation; and
    in response to the request, using a backup policy to determine how to re-use a number of storage containers based on the local backup operation when more than the first number of local versions are backed up with local backup operations.

18. The system of claim 17, wherein a new policy construct is provided that defines how many local versions of the data set are to be stored in the local storage given the amount of available local storage.

19. The system of claim 17, the operations further comprising:
  overloading an existing policy construct that defines how many local versions of the data set are to be stored in the local storage given the amount of available local storage.

20. The system of claim 17, wherein each local version of the data set is stored in one of the one or more local storage containers in the local storage.

21. The system of claim 17, wherein the amount of storage used is a third number of local storage containers and wherein the first number and third number are equivalent, the operations further comprising:
  using the backup policy to determine how to re-use the third number of storage containers when more than the first number of local versions are backed up with the local backup operations.

22. The system of claim 21, wherein the local backup operation is the instant virtual copy operation, and wherein the backup policy indicates that a local storage container representing an oldest full copy is to be re-used as long as there are no other virtual instant copy operations on other local storage containers.

23. The system of claim 21, wherein the local backup operation is the incremental virtual copy operation and wherein a local storage container representing a backup copy that was established with an incremental relationship is re-used as long as there are no background copy processes or incremental refreshes still in effect on volumes in that local storage container, wherein the incremental virtual copy operation copies blocks of data that were updated on a source and a target since a last instant virtual copy operation from the source to the target.

24. The system of claim 17, the operations further comprising:
  in response to determining that the first number exceeds the second number, failing a backup operation for any local version of the data set exceeding the second number.

* * * * *

UNITED STATES PATENT AND TRADEMARK OFFICE
CERTIFICATE OF CORRECTION

PATENT NO.      : 7,617,260 B2                                    Page 1 of 1
APPLICATION NO. : 11/271037
DATED           : November 10, 2009
INVENTOR(S)     : Augenstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Nineteenth Day of October, 2010

David J. Kappos
*Director of the United States Patent and Trademark Office*